US009722872B2

(12) United States Patent
Amann et al.

(10) Patent No.: US 9,722,872 B2
(45) Date of Patent: *Aug. 1, 2017

(54) CLUSTER RECONFIGURATION MANAGEMENT

(71) Applicant: International Business Machines Corporation, Armonk, NY (US)

(72) Inventors: Stefan Amann, Boeblingen (DE); Juliane Aulbach, Boeblingen (DE); Gerhard Banzhaf, Nufringen (DE); Ralph Friedrich, Sindelfingen (DE); Juergen Leopold, Filderstadt (DE)

(73) Assignee: International Business Machines Corporation, Armonk, NY (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/513,284

(22) Filed: Oct. 14, 2014

(65) Prior Publication Data

US 2015/0372867 A1    Dec. 24, 2015

Related U.S. Application Data

(63) Continuation of application No. 14/311,456, filed on Jun. 23, 2014, now Pat. No. 9,473,353.

(51) Int. Cl.
*G06F 15/177* (2006.01)
*H04L 12/24* (2006.01)
(Continued)

(52) U.S. Cl.
CPC .......... *H04L 41/082* (2013.01); *G06F 9/4445* (2013.01); *G06F 9/45558* (2013.01);
(Continued)

(58) Field of Classification Search
CPC ............... H04L 41/082; H04L 41/0813; H04L 41/0816; H04L 41/0846; H04L 61/00;
(Continued)

(56) References Cited

U.S. PATENT DOCUMENTS 6,122,279 A    9/2000  Milway et al.
6,745,281 B1   6/2004  Saegusa
(Continued)

FOREIGN PATENT DOCUMENTS

EP   2017711 A2     1/2009
WO   2010060721 A1  6/2010

OTHER PUBLICATIONS

"Best Practices Guide: Emulex Virtual HBA® Solutions and VMware® ESX Server 3.5", How to deploy VMware ESX Server 3.5 on a Fibre Channel Using Emulex Virtual HBA Technology, Copyright © 2007 Emulex, pp. 1-15.
(Continued)

*Primary Examiner* — Michael Y Won
(74) *Attorney, Agent, or Firm* — Bryan D. Wells; David M. Quinn

(57) ABSTRACT

Assigning a set of port names to storage access paths of virtual machines accessing storage resources via storage area networks is provided. A first computing system cluster that is associated with a set of computing system identifiers is created. A first computing system identifier associated with a first computing system is added to the set of computing system identifiers. The first computing system is disassociated from the first computing system identifier. The first computing system is added to the first computing system cluster.

19 Claims, 7 Drawing Sheets

(51) Int. Cl.
*H04L 29/08* (2006.01)
*G06F 9/44* (2006.01)
*H04L 29/12* (2006.01)
*G06F 9/455* (2006.01)

(52) U.S. Cl.
CPC ...... *H04L 41/0816* (2013.01); *H04L 41/0846* (2013.01); *H04L 61/00* (2013.01); *H04L 67/101* (2013.01); *H04L 67/1097* (2013.01); *G06F 2009/4557* (2013.01); *G06F 2009/45562* (2013.01); *H04L 41/0813* (2013.01)

(58) Field of Classification Search
CPC .. H04L 67/1097; H04L 67/101; G06F 9/4445
See application file for complete search history.

(56) References Cited

U.S. PATENT DOCUMENTS

| | | | |
|---|---|---|---|
| 6,847,993 | B1 | 1/2005 | Novaes et al. |
| 7,512,133 | B2 | 3/2009 | Dugan et al. |
| 7,680,773 | B1 | 3/2010 | Acharya et al. |
| 7,693,811 | B2 | 4/2010 | Adlung et al. |
| 7,711,979 | B2 * | 5/2010 | Salli .................. G06F 11/2033 714/3 |
| 7,739,415 | B2 | 6/2010 | Banzhaf et al. |
| 7,769,913 | B1 | 8/2010 | Budhia et al. |
| 7,831,681 | B1 | 11/2010 | Salli |
| 7,925,817 | B2 | 4/2011 | Uehara et al. |
| 7,970,852 | B2 | 6/2011 | Allen et al. |
| 8,429,446 | B2 | 4/2013 | Hara et al. |
| 8,483,087 | B2 | 7/2013 | Bose et al. |
| 8,554,981 | B2 | 10/2013 | Schmidt et al. |
| 8,688,704 | B1 | 4/2014 | Horling et al. |
| 8,953,836 | B1 | 2/2015 | Postelnicu et al. |
| 9,143,439 | B2 * | 9/2015 | Wang ..................... H04L 45/46 |
| 9,215,083 | B2 | 12/2015 | Johnsen et al. |
| 2002/0049859 | A1 | 4/2002 | Bruckert et al. |
| 2002/0124089 | A1 * | 9/2002 | Aiken, Jr. ............... H04L 29/06 709/227 |
| 2004/0024732 | A1 * | 2/2004 | Klisch .................... H04L 41/12 |
| 2005/0114476 | A1 | 5/2005 | Chen et al. |
| 2005/0160413 | A1 * | 7/2005 | Broussard ............. G06F 9/4856 717/148 |
| 2006/0242271 | A1 | 10/2006 | Tucker et al. |
| 2008/0209070 | A1 | 8/2008 | Horn |
| 2009/0024674 | A1 | 1/2009 | Gallagher |
| 2009/0025007 | A1 | 1/2009 | Hara et al. |
| 2010/0106723 | A1 | 4/2010 | Lee |
| 2010/0250785 | A1 | 9/2010 | Shin et al. |
| 2011/0216940 | A1 | 9/2011 | Morioka et al. |
| 2012/0030599 | A1 | 2/2012 | Butt et al. |
| 2012/0054850 | A1 | 3/2012 | Bhardwaj et al. |
| 2012/0079195 | A1 | 3/2012 | Bolen et al. |
| 2012/0218990 | A1 | 8/2012 | Subramanyan et al. |
| 2013/0046892 | A1 | 2/2013 | Otani |
| 2013/0167206 | A1 | 6/2013 | Hiroki |
| 2013/0282887 | A1 | 10/2013 | Terayama et al. |
| 2014/0059187 | A1 | 2/2014 | Rosset et al. |
| 2015/0023213 | A1 | 1/2015 | Soneda et al. |
| 2015/0106518 | A1 | 4/2015 | Amann et al. |
| 2015/0248251 | A1 * | 9/2015 | Helman ................ G06F 3/0622 711/114 |
| 2015/0372858 | A1 | 12/2015 | Amann et al. |
| 2015/0372867 | A1 | 12/2015 | Amann et al. |

OTHER PUBLICATIONS

U.S. Appl. No. 14/311,456, entitled "Cluster Reconfiguration Management", filed Jun. 23, 2014.
IBM, "Method and Apparatus for Flexible Deployment and Migration of Virtual Servers with SAN-attached Storage on a Server Cluster", Nov. 5, 2013, pp. 1-32.
Posey, Brien M., "A First Look at Hyper-Vs Virtual Fibre Channel Feature (Part 1)", VirtualizationAdmin.com, Published on Jun. 27, 2013 / Last updated on Jul. 19, 2013, pp. 1-3, <http://www.virtualizationadmin.com/articles-tutorials/microsoft-hyper-v-articles/storage-management/first-look-hyperv-vs-virtual-fibre-channel-feature-part1.html>.
Amann et al., "Cluster Reconfiguration Management", U.S. Appl. No. 14/311,456, filed Jun. 23, 2014.
Amann et al., "Flexible Deployment and Migration of Virtual Machines", U.S. Appl. No. 14/311,440, filed Jun. 23, 2014.
Amann et al., "Flexible Deployment and Migration of Virtual Machines", U.S. Appl. No. 14/513,325, filed Oct. 14, 2014.
Appendix P, List of IBM Patents or Patent Applications Treated as Related.
Appendix P, List of IBM Patents or Patent Applications Treated as Related, 2 pages, dated Mar. 10, 2017.

* cited by examiner

CLUSTER RECONFIGURATION MANAGEMENT

BACKGROUND OF THE INVENTION

The present invention relates generally to the field of cluster computing, and more particularly to cluster reconfiguration management.

Infrastructure as a service (IaaS) is a cloud-services model offering computers and other resources as a cloud. Generally, the computers include both physical computers and virtual machines. In some implementations, the computers are clustered. Each cluster hosts a dedicated or mixed workload. Typically, the computers of a cluster can access resources, including a storage area network (SAN). A SAN is a computing network that provides access to data storage. A SAN typically has its own network of storage devices that are generally not accessible through a local area network (LAN) by other devices.

SUMMARY

According to one embodiment of the present disclosure, a method for assigning a set of network names to storage access paths of virtual machines accessing storage resources via storage area networks is provided. The method includes creating a first computing system cluster, wherein the first computing system cluster is associated with a set of computing system identifiers; adding a first computing system identifier that is associated with a first computing system to the set of computing system identifiers; disassociating the first computing system with the first computing system identifier; and adding the first computing system to the first computing system cluster.

According to another embodiment of the present disclosure, a computer program product for assigning a set of network names to storage access paths of virtual machines accessing storage resources via storage area networks is provided. The computer program product comprising a computer readable storage medium and program instructions stored on the computer readable storage medium. The program instructions include program instructions to program instructions to create a first computing system cluster, wherein the first computing system cluster is associated with a set of computing system identifiers; program instructions to add a first computing system identifier that is associated with a first computing system to the set of computing system identifiers; program instructions to disassociate the first computing system with the first computing system identifier; and program instructions to add the first computing system to the first computing system cluster.

According to another embodiment of the present disclosure, a computer system for assigning a set of network names to storage access paths of virtual machines accessing storage resources via storage area networks is provided. The computer system includes one or more computer processors, one or more computer readable storage media, and program instructions stored on the computer readable storage media for execution by at least one of the one or more processors. The program instructions include program instructions to program instructions to create a first computing system cluster, wherein the first computing system cluster is associated with a set of computing system identifiers; program instructions to add a first computing system identifier that is associated with a first computing system to the set of computing system identifiers; program instructions to disassociate the first computing system with the first computing system identifier; and program instructions to add the first computing system to the first computing system cluster.

DETAILED DESCRIPTION

Embodiments of the present invention recognize that virtual servers deployed in a cluster of physical servers typically access storage resources via storage area networks (SANs), using unique network port names. The network port names are often based on an identifier of a physical server. The network port names are often configured in the SAN to enable access to specific storage resources. Further recognized is that, when virtual servers are dynamically deployed in or migrated within a cluster, their network port names may not correspond to the identifier of the physical server on which they are currently running. Further recognized is that adding or removing virtual servers to or from the cluster requires updating the assigned network port names to ensure that the names are still based on identifiers of physical servers of the cluster. This update can disrupt communications between virtual servers and the SAN.

Embodiments of the present invention provide cluster reconfiguration management. The cluster includes one or more computers that have access to a network. The computers include physical servers, virtual servers, or both. Reconfiguration of a cluster involves, for example, adding, removing, or replacing a physical server or virtual server of the cluster. In some cases, cluster reconfiguration involves migrating a virtual server from one physical server to another. Further provided is management of the identifiers of physical servers of a cluster. Further provided is assigning identifiers to and removing identifiers from physical servers during cluster reconfiguration. Further provided is allowing a change in a network port name of a virtual server without reconfiguration of a network resource, such as a SAN. Further provided is maintaining non-disruptive network access during cluster reconfiguration.

Figure 1:
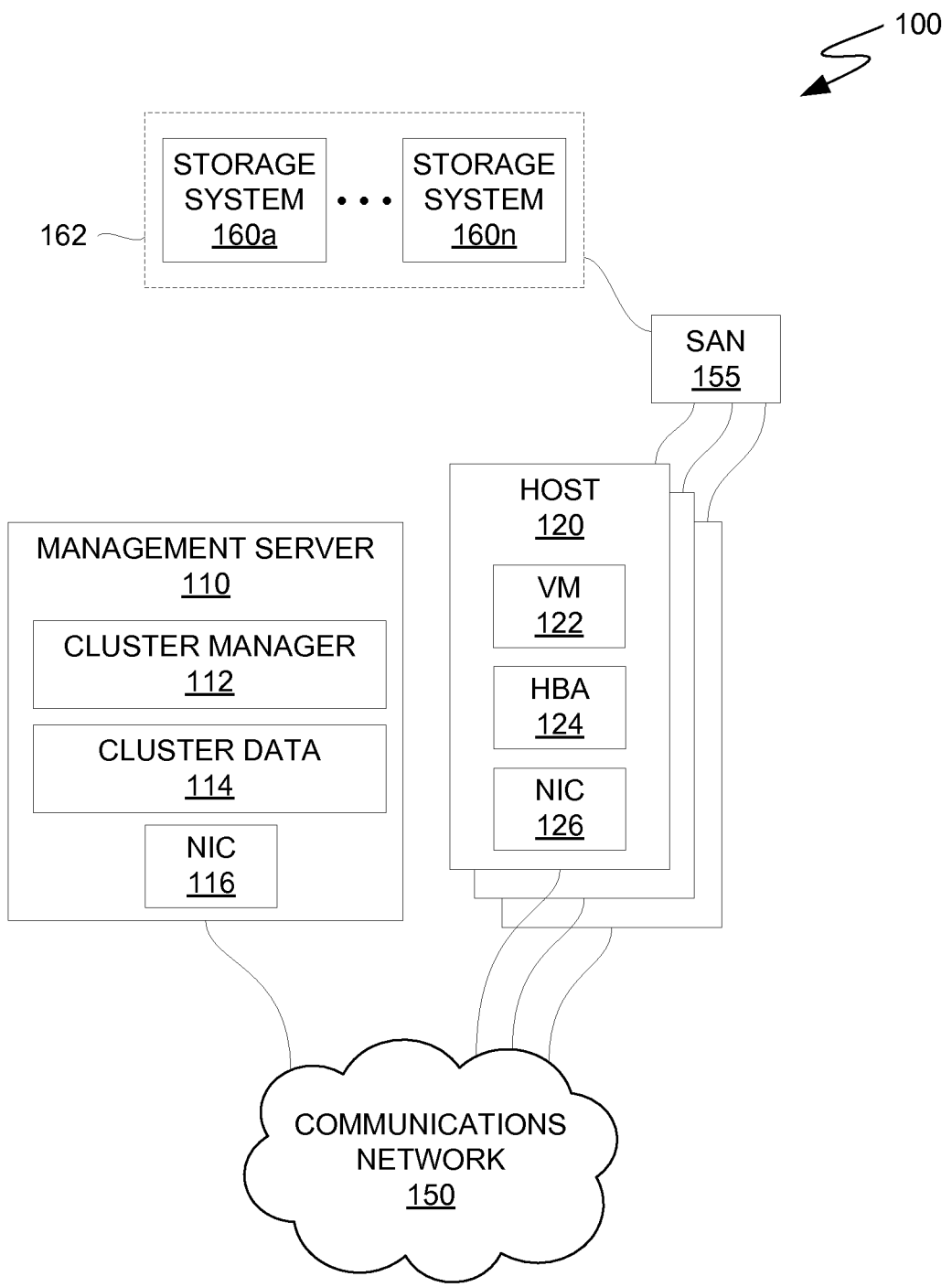
FIG. 1 is a functional block diagram illustrating a computing environment, in accordance with an embodiment of the present disclosure.

The present disclosure will now be described in detail with reference to the Figures. FIG. 1 is a functional block diagram illustrating a computing environment, in accordance with one embodiment of the present disclosure. For example, FIG. 1 is a functional block diagram illustrating computing environment 100. Computing environment 100 includes management server 110 and host 120 interconnected over network 150, and storage controller 162, which includes storage systems 160a-160n (collectively, storage systems 160), interconnected with host 120 over SAN 155.

In one embodiment, SAN 155 enables host-to-storage device connectivity through a switching technology, such as Fiber Channel (FC) switching technology. SAN 155 may include one or more switches and other devices such as bridges, hubs, routers, interconnecting cables (e.g., fiber optic cables), and the like. In other embodiments, SAN 155 can be, for example, a local area network (LAN), a wide area network (WAN) such as the Internet, or a combination of the two, and may include wired, wireless, fiber optic or any other connections known in the art. In general, SAN 155 can be any combination of connections and protocols that will support communications between host 120, storage controller 162, and storage systems 160, in accordance with a desired embodiment of the present invention. In one embodiment, SAN 155 may be a network resource accessible by one or more of management server 110 and host 120 via network 150. Network 150 can be, for example, a local area network (LAN), a wide area network (WAN) such as the Internet, or a combination of the two, and may include wired, wireless, fiber optic or any other connections known in the art. In general, network 150 can be any combination of connections and protocols that will support communications between host 120 and management server 110, in accordance with a desired embodiment of the present invention.

In one embodiment, storage controller 162 includes storage systems 160. Storage systems 160, in various embodiments, include redundant array of independent disk (RAID) systems, just a bunch of disk (JBOD) arrays, disk arrays, tape devices, optical storage devices, or other storage resources. Each of storage systems 160 can include, for example, a magnetic hard disk drive, other magnetic storage device, a solid state hard drive, a semiconductor storage device, read-only memory (ROM), erasable programmable read-only memory (EPROM), flash memory, an optical storage device, or any other computer-readable storage media that is capable of storing digital information. Each of storage systems 160, via storage controller 162, is communicatively coupled with SAN 155.

In one embodiment, storage controller 162 manages and monitors SAN resources and conditions, based on which storage controller 162 performs policy-based actions. Storage controller 162, on which host bus adapters (HBAs) are installed and storage resources are stored (e.g., storage systems 160), communicates with the SANs (e.g., SAN 155) via HBAs. For example, storage controller 162 manages storage resources through zoning and logical unit number (LUN) access control. Zoning is a security mechanism that is utilized to control access between devices via SAN 155. In one embodiment, storage controller 162 controls access of host 120 to storage systems 160 based on user specifications. For example, the user specifications may configure one or more zones or LUN access controls, which are discussed in further detail below.

In one embodiment, management server 110 includes cluster manager 112, cluster data 114, and network interface controller (NIC) 116. NIC 116 provides an interface between management server 110 and network 150.

In one embodiment, cluster manager 112 operates to discover network devices, such as hosts (e.g., host 120), HBAs, switches, and other devices connected to or included within network 150. Cluster manager 112 maintains a database of host identifiers and port names. For example, cluster manager 112 maintains cluster data 114. In one embodiment, cluster manager 112 adds a host (e.g., host 120) to a cluster. In another embodiment, cluster manager 112 removes a host (e.g., host 120) from a cluster. In yet another embodiment, cluster manager 112 performs composite actions of adding and removing hosts. For example, cluster manager 112 substitutes a first host of a cluster with a second host by adding the second host and removing the first host.

In one embodiment, cluster data 114 is a database that is written to, read by, or both written to and read by cluster manager 112. Host identifiers and port names may be stored to cluster data 114. For example, cluster manager 112 stores a host identifier of host 120 and at least one world-wide port name (WWPN) of HBA 124 to cluster data 114. In some embodiments, cluster data 114 may be written to and read by programs and entities outside of computing environment 100 in order to populate the database with host identifiers and port names. In one embodiment, cluster data 114 resides on management server 110. In other embodiments, cluster data 114 may reside on another computing device (e.g., host 120), provided that cluster data 114 is accessible to cluster manager 112.

Host 120 includes virtual machine (VM) 122, HBA 124, and NIC 126. In some embodiments, host 120 refers to each of one or more physical servers (i.e., hosts), each of which includes zero or more virtual machines and at least one HBA. NIC 126 provides an interface between host 120 and network 150. In one embodiment, NIC 126 may be a network interface controller. For example, NIC 126 may be an Ethernet adapter. HBA 124 provides an interface between host 120 and SAN 155. In one embodiment, HBA 124 may be a Fibre Channel adapter, by which host 120 connects to SAN 155. HBA 124 is associated with a port name (e.g., a WWPN). For example, cluster manager 112 assigns a WWPN to HBA 124. Cluster manger 112 stores the WWPN and the association between the WWPN and HBA 124 to cluster data 114.

VM 122 is, in one embodiment, a virtual server. In one embodiment, host 120 includes a hypervisor (not shown) that creates and runs VM 122. Host 120 includes at least one physical HBA (e.g., HBA 124) that can be virtualized to a plurality of virtual host bus adapters (vHBAs) (not shown) assigned to VMs to access storage resources via SANs. VM 122 has at least one assigned vHBA (not shown). In one embodiment, the vHBA connects VM 122 to SAN 155. In one embodiment, each vHBA is associated with at least one port name (e.g., a WWPN). Cluster manger 112 stores the WWPNs of each vHBA and the association between the WWPNs and the vHBA to cluster data 114. For example, cluster manager 112 assigns two WWPNs to a vHBA by which VM 122 connects to SAN 155. In another example, VM 122 has two vHBAs, each of which has one port name. In one embodiment, a port name is either active or inactive, based on whether the port name is actively identifying a vHBA on a network (e.g., SAN 155). In one embodiment, a vHBA is either active or inactive, based on whether the vHBA has an active connection to a network (e.g., SAN 155). For example, VM 122 connects to SAN 155 via an active vHBA, which is identified on SAN 155 by an active WWPN. In one embodiment, port names are unique within a network. For example, a port name assigned to a first port connected to SAN 155 is not assigned to a second port connected to SAN 155. In another example, a port name of an HBA or vHBA is unique across all other port names of SAN 155. In one embodiment, the port names of each vHBA of a VM are generated by cluster manager 112 based on a physical server identifier of the host upon which the VM resides. For example, host 120 is associated with the identifier "30", in which case a first vHBA of VM 122 is assigned WWPN "w30*a*1" and a second vHBA of VM 122 is assigned WWPN "w30*a*2". In this example, the format of the WWPN includes, in part, a leading "w" followed by the identifier of the physical server on which the VM is running.

In various embodiments of the present invention, each of management server 110 and host 120 is a computing device that can be a standalone device, a server, a laptop computer, a tablet computer, a netbook computer, a personal computer (PC), or a desktop computer. In another embodiment, each of management server 110 and host 120 represents a computing system utilizing clustered computers and components to act as a single pool of seamless resources. In general, each of management server 110 and host 120 can be any computing device or combination of devices that has access to each other of management server 110, cluster manager 112, cluster data 114, NIC 116, host 120, VM 122, HBA 124, NIC 126, and storage system 160, and that is capable of executing cluster manager 112 and VM 122. Each of management server 110 and host 120 may include internal and external hardware components, as depicted and described in further detail with respect to FIG. 6.

In this exemplary embodiment, cluster manager 112 and cluster data 114 are stored on management server 110, and VM 122 is stored on host 120. However, in other embodiments, each of cluster manager 112, cluster data 114, and VM 122 may be stored on management server 110, host 120, or any combination thereof. In yet other embodiments, each of cluster manager 112, cluster data 114, and VM 122 may be stored externally and accessed through a communication network, such as one or both of network 150 and SAN 155.

A LUN is the small computer system interface (SCSI) identifier of a logical unit within a target, which is the system component that receives a SCSI input/output (I/O) command. A logical unit is an entity within a SCSI target that executes I/O commands. SCSI I/O commands are sent to a target and are executed by a logical unit within that target. A SCSI physical disk typically has a single logical unit. Tape drives and array controllers may incorporate multiple logical units to which I/O commands can be addressed. LUN access control is the collective name given to the operations involved in making storage resources of storage systems 160 available to hosts within computing environment 100 (e.g., host 120), and may include LUN locating or searching, LUN binding, and/or LUN masking. LUN security provides granular control over access of a host to individual LUNs within an array or other collection of potentially heterogeneous storage devices. LUN binding is generally defined as the creation of access paths between LUNs within a disk array and ports on the array. LUN masking is generally defined as enabling access to LUNs for host HBA ports.

Figure 2:
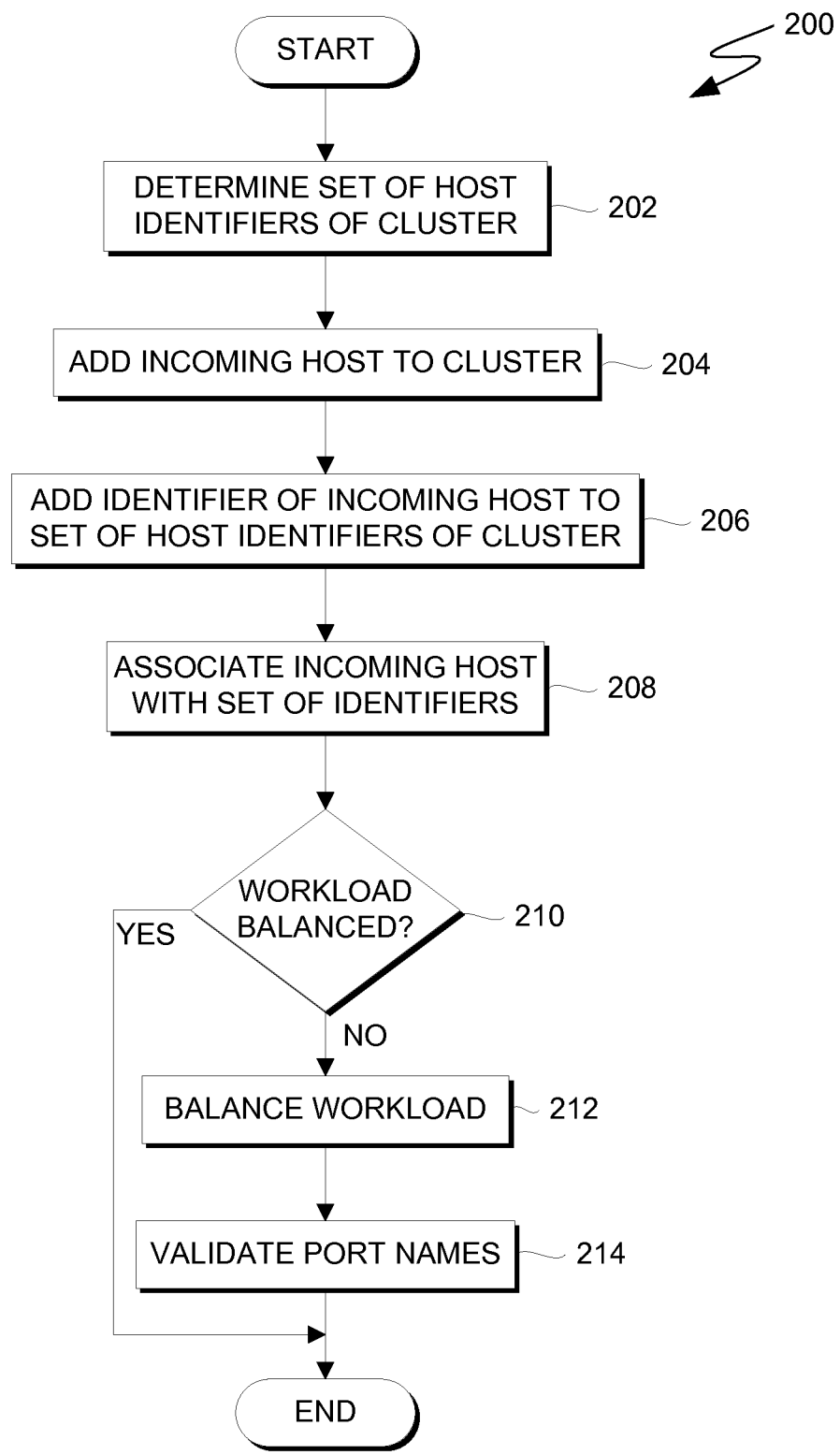
FIG. 2 is a flowchart depicting operations for cluster management, on a computing device within the computing environment of FIG. 1, in accordance with an embodiment of the present disclosure.

FIG. 2 is a flowchart depicting operations for cluster management, on a computing device within the computing environment of FIG. 1, in accordance with an embodiment of the present disclosure. For example, FIG. 2 is a flowchart depicting operations 200 of cluster manager 112, on management server 110 within computing environment 100.

Initially, cluster manager 112 creates a computing cluster. In one embodiment, the computing cluster includes at least one host. For example, the computing cluster includes management server 110 and a set of one or more hosts, such as host 120. In one embodiment, cluster manager 112 initially creates a computing cluster by logically organizing a set of hosts into a cluster. As described above, each host of the cluster includes zero or more VMs. In one embodiment, each host of the cluster includes one or more VMs.

In operation 202, cluster manager 112 determines a set of host identifiers of the cluster. In one embodiment, each host of the cluster has one or more identifiers. In an alternate embodiment, a host of the cluster has zero identifiers. For example, the identifier of the host may be added to the set of host identifiers of the cluster and disassociated with the host. In one embodiment, cluster manager 112 determines the set of host identifiers of the cluster based on the identifiers of each host of the cluster. For example, cluster manager 112 stores the set of host identifiers to cluster data 114 in association with the cluster. In one embodiment, cluster manager 112 associates each host with the set of host identifiers. In one example, cluster manager 112 replaces the host identifier of each host with a reference to the set of host identifiers. In an alternate example, cluster manager 112 associates each host with the set of host identifiers while maintaining the association of each host to the original host identifier of that host.

In operation 204, cluster manager 112 adds an incoming host to the cluster. In one embodiment, cluster manager 112 adds the incoming host to the cluster by modifying cluster data 114 to reflect an association between the incoming host and the cluster. The incoming host has one or more host identifiers. In one embodiment, the incoming host has a workload that includes one or more VMs. In one embodiment, cluster manager 112 adds the incoming host to the cluster based on user input. For example, cluster manager 112 receives user input specifying addition of a host to the cluster. In response, cluster manager 112 adds the host specified by the user input to the cluster. In another example, the user input specifies migration of a host from a source cluster to a destination cluster. In this case, cluster manager 112 adds the host specified by the user input to the destination cluster.

In operation 206, cluster manager 112 adds the identifier of the incoming host to the set of host identifiers of the cluster. In one embodiment, the set of host identifiers of the cluster initially includes the identifier of each host of the cluster other than the incoming host. In this case, the set of host identifiers includes the identifier of each host of the cluster, including the incoming host, after cluster manager 112 adds the identifier of the incoming host. In some embodiments, cluster manager 112 removes the identifier of the incoming host from the incoming host, thereby disassociating the incoming host with the identifier.

In operation 208, cluster manager 112 associates the incoming host with the set of identifiers. In one embodiment, cluster manager 112 stores an association between the incoming host and the set of identifiers. For example, cluster manager 112 stores the association to cluster data 114. In another embodiment, cluster manager 112 associates the incoming host with the set of identifiers by replacing the identifier of the incoming host with the set of identifiers (or, alternatively, with a reference to the set of identifiers) of the cluster.

In decision 210, cluster manager 112 determines whether the workload of the cluster is balanced. In one embodiment, cluster manager 112 determines whether the workload of the cluster is balanced based on the workload of each host of the cluster, including the incoming host. The workload of each host of the cluster includes zero or more VMs. For example, cluster manager 112 compares the workloads of each host of the cluster. In another embodiment, cluster manager 112 determines whether the workload of the cluster is balanced based on cluster manager 112 receiving user input that specifies whether to re-balance the workload of the cluster. For example, the user input specifies which, if any, VMs to migrate. If cluster manager 112 determines that the workload of the cluster is balanced (decision 210, YES branch), then operations 200 are concluded. If cluster manager 112 determines that the workload of the cluster is not balanced (decision 210, NO branch), then cluster manager 112 balances the workload of the cluster (operation 212).

In operation 212, cluster manager 112 balances the workload of the cluster. In one embodiment, cluster manager 112 balances the workload of the cluster by migrating one or more VMs between hosts of the cluster. For example, cluster manager 112 migrates a VM from a first host with a high workload to a second host with a low workload.

In operation 214, cluster manager 114 validates the port names of the hosts of the cluster. In one embodiment, cluster manager 114 validates only those port names of the incoming host. For example, the port names of the incoming host includes the port name of each HBA of the incoming host and the port name(s) of each vHBA of each VM of the incoming host. Cluster manager 114 verifies a port name to ensure that the port name is based on a host identifier that is included in the set of host identifiers of the cluster. In one embodiment, cluster manager 112 verifies the port names of a VM. For example, cluster manager 112 migrating a VM between hosts includes verifying the port names of each vHBA of the VM. In some embodiments, cluster manager 114, in verifying a port name, determines that the port name fails verification based on determining that the port name is not based on a host identifier of the set of host identifiers of the cluster. In this case, cluster manager 114 updates the port name based on a host identifier of the set of host identifiers of the cluster. For example, cluster manager 114 updates the port name of a vHBA of a VM based on the host identifier of the host to which cluster manager 114 migrates the VM. Updating port names is discussed more fully in connection with FIGS. 4-5.

Figure 3:
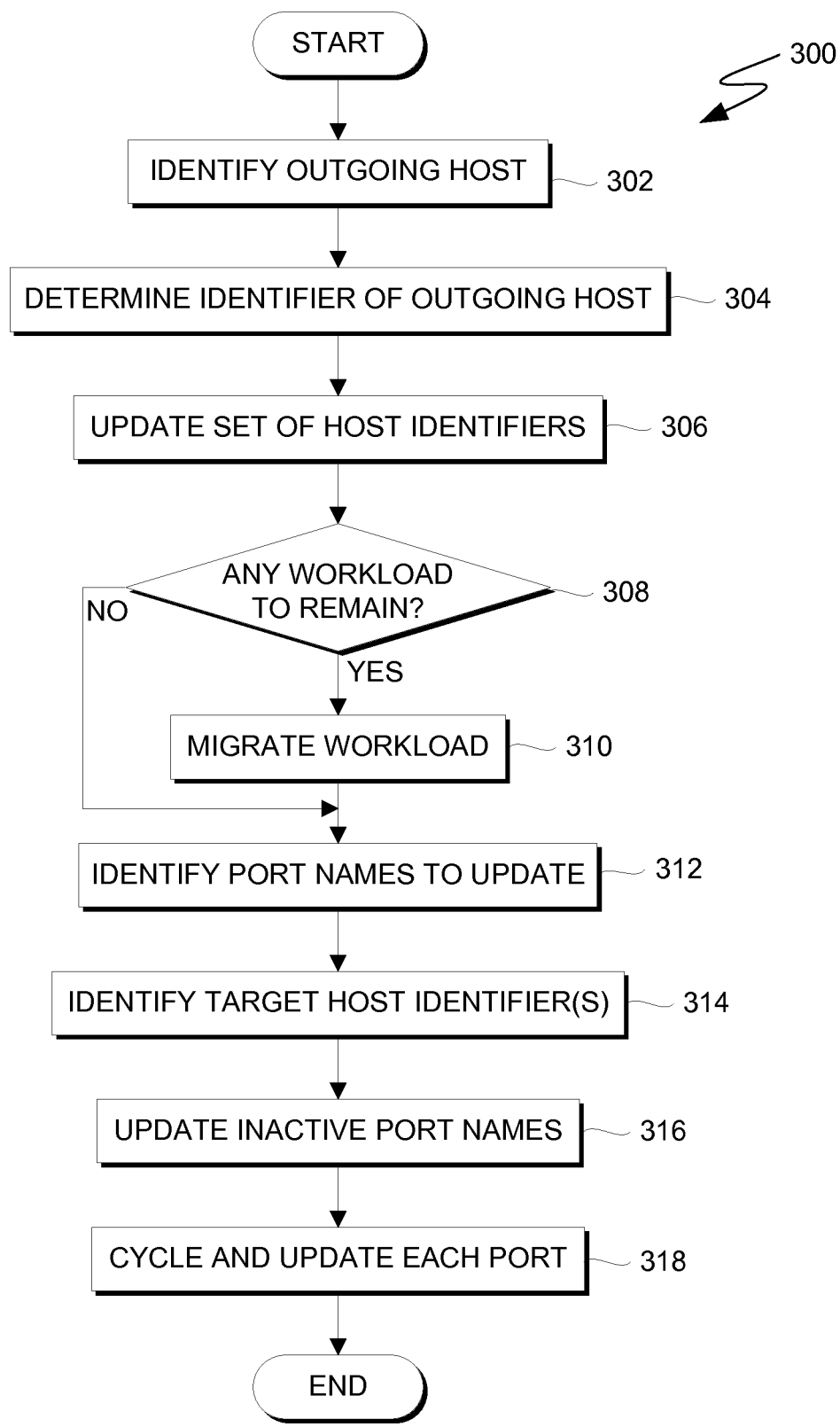
FIG. 3 is a flowchart depicting operations for cluster management, on a computing device within the computing environment of FIG. 1, in accordance with an embodiment of the present disclosure.

FIG. 3 is a flowchart depicting operations for cluster management, on a computing device within the computing environment of FIG. 1, in accordance with an embodiment of the present disclosure. For example, FIG. 3 is a flowchart depicting operations 300 of cluster manager 112, on management server 110 within computing environment 100.

In operation 302, cluster manager 112 identifies an outgoing host. In one embodiment, the outgoing host is a host of a cluster that is to be removed. In one embodiment, cluster manager 112 identifies the outgoing host based on user input. For example, the user input specifies removing host 120 from a cluster, in which case cluster manager 112 identifies host 120 as the outgoing host.

In some embodiments, the outgoing host has a workload that may include one or more VMs. Some or all of the workload of the outgoing host may be removed from the cluster along with the outgoing host. Conversely, the remainder of the workload of the outgoing host may remain in the cluster. For example, an outgoing host may have a workload including a first VM and a second VM. In this example, the first VM is removed from the cluster with the outgoing host and the second VM is migrated to another host that remains in the cluster. In one embodiment, cluster manager 112 identifying the outgoing host (operation 302) includes identifying whether to migrate a portion of the workload of the outgoing host to another host of the cluster. For example, cluster manager 112 may receive user input that specifies removing the outgoing host from the cluster and, for each VM of the outgoing host, whether to remove the VM from the cluster with the outgoing host or to migrate the VM to another host of the cluster.

In operation 304, cluster manager 112 determines an identifier of the outgoing host. In one embodiment, cluster manager 112 determines the identifier based on the set of host identifiers of the cluster. For example, cluster manager 112 determines the identifier by selecting a host identifier of the set of host identifiers and assigning the selected host identifier to the outgoing host. Cluster manager 112 may select any host identifier of the set of host identifiers. In one embodiment, cluster manager 112 selects the host identifier that cluster manager 112 added to the set of host identifiers in response to the outgoing host joining the cluster initially. In another embodiment, cluster manager 112 selects a host identifier from the set of host identifiers randomly. In yet another embodiment, cluster manager 112 selects the host identifier based on the port names of the VMs of the outgoing host. For example, cluster manager 112 selects a host identifier upon which a port name of a vHBA of a VM of the outgoing host is based.

In operation 306, cluster manager 112 updates the set of host identifiers of the cluster. In one embodiment, cluster manager 112 updates the set of host identifiers by disabling port name formation based on the host identifier of the outgoing host. In another embodiment, cluster manager 112 updates the set of host identifiers by removing the host identifier of the outgoing host from the set of host identifiers.

In decision 308, cluster manager 112 determines whether any workload of the outgoing host is to remain in the cluster. In one embodiment, cluster manager 112 determines whether any workload is to remain in the cluster based on a specification provided via user input. For example, cluster manager 112 receives user input identifying the outgoing host (see operation 302), which also identifies at least a portion of the workload (e.g., one or more VMs) of the outgoing host to remain in the cluster. In another example, the user input specifies no portion of the workload to remain in the cluster. If cluster manager 112 determines that some or all of the workload of the outgoing host is to remain in the cluster (decision 308, YES branch), then cluster manager 112 migrates the workload that is to remain to another host of the cluster (operation 310). If cluster manager 112 determines that no workload of the outgoing host is to remain in the cluster (decision 308, NO branch), then cluster manager 112 identifies port names to update (operation 312).

In operation 310, cluster manager 112 migrates the workload that is to remain in the cluster from the outgoing host to another host in the cluster. In one embodiment, migrating the workload includes moving or copying one or more VMs from the outgoing host to another host in the cluster. Such a VM may have a vHBA with a port name based on the host identifier of the outgoing host. Alternatively, the port name may be based on another host identifier of the set of host identifiers of the cluster.

In operation 312, cluster manager 112 identifies port names to update. In one embodiment, cluster manager 112 identifies port names to update based on the host identifier upon which the port name is based. For example, cluster manager 112 identifies port names that are based on the host identifier of the outgoing host if port names are assigned to a vHBA of a VM that resides on the outgoing host. In another example, cluster manager 112 identifies port names that are based on the host identifier of the outgoing host if the port names are assigned to a vHBA of a VM that does not reside on the outgoing host.

In operation 314, cluster manager 112 identifies one or more target host identifiers. In one embodiment, cluster manager 112 identifies a target host identifier for each port name to be updated. In another embodiment, cluster manager 112 identifies the same target host identifier for the port names that are assigned to the same port. For example, cluster manager 112 identifies the host identifier of the outgoing host as the target host identifier for the ports of a VM that resides on the outgoing host but has port names that are based on another host identifier. In another example, cluster manager 112 identifies a host identifier of the set of host identifiers of the cluster other than the host identifier of the outgoing host as the target host identifier for the ports of a VM that does not reside on the outgoing host but has port names that are based on the outgoing host.

In operation 316, cluster manager 112 updates inactive port names. In one embodiment, cluster manager 112 replaces each identified port name (see operation 312) that is inactive with a port name that is based on the target host identifier (see operation 314) for that port.

In operation 318, cluster manager 112 cycles and updates each port that has an active port name. In one embodiment, cluster manager 112 cycles and updates each port of a VM in turn, thereby maintaining the network (i.e., a SAN) connection of the VM through at least one port. In one embodiment, cluster manager 112 cycles and updates a port by disabling network access of the port, deactivating the port, replacing a port name of the port, activating the port, and enabling network access of the port. For example, cluster manager 112 replaces an identified port name (see operation 312) with a new port name based on a target host identifier (see operation 314).

FIGS. 4A-4E are block diagrams depicting an example in which port names are updated, in accordance with an embodiment of the present disclosure. In the example depicted by FIGS. 4A-4E, the port names of a host are updated. Host 410 is associated with a host identifier of "10". Host 410 has a workload including VM 412, which has two ports: vHBA 422a and vHBA 422b. Ports vHBA 422a and 422b are virtual host bus adapters of HBA 420. VM 412 is connected to a network (not shown) via each of vHBA 422a and 422b of HBA 420. Port names 414a are assigned to vHBA 422a. Port names 414b are assigned to vHBA 422b. Port names 414a includes port names 416a and 416b. Port names 414b includes port names 418a and 418b. Port names 416a and 418b are active port names, and port names 416b and 418a are inactive port names. Thus, VM 412 is connected to a network (not shown) via vHBA 422a using port name 416a and via vHBA 422b using port name 418b. Host 410 is a host of a cluster (not shown) that has a set of host identifiers (not shown). The set of host identifiers is {10, 20, 30, 40}.

In this example, initially, cluster manager 112 determines a host identifier for an outgoing host (not shown) (see operation 304) to be "30". Cluster manager removes host identifier "30" from the set of host identifiers of the cluster (see operation 306), which updates the set of host identifiers of the cluster to {10, 20, 40}. Cluster manager 112 determines that the workload to remain in the cluster includes VM 412 (see operation 308). Cluster manager 112 migrates VM 412 to host 410, which is a host of the cluster (see operation 310).

Figure 4A:
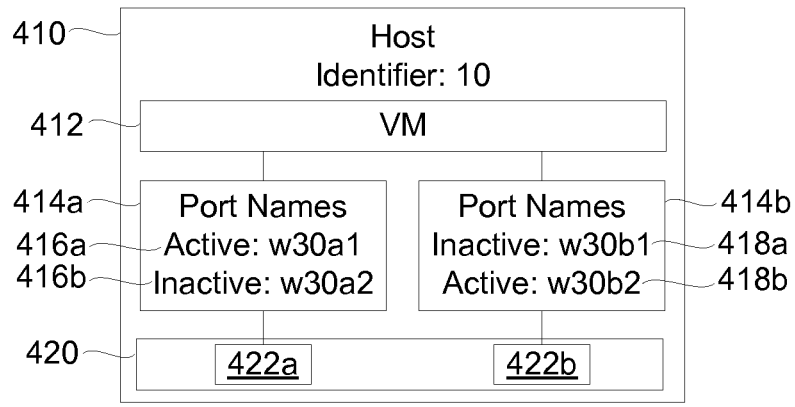
FIGS. 4A-4E are block diagrams depicting an example in which port names are updated, in accordance with an embodiment of the present disclosure.

As shown in FIG. 4A, cluster manager 112 identifies port names to update (see operation 312). Each of port names 416a, 416b, 418a, and 418b are based on a host identifier that is not in the set of host identifiers of the cluster. Instead, the ports are based on host identifier of the outgoing host, but the port names are assigned to ports 422a and 422b of VM 412, which resides on a host other than the outgoing host. Cluster manager 112 identifies each port name of VM 412 (i.e., port names 416a, 416b, 418a, and 418b) as port names to update.

Figure 4B:
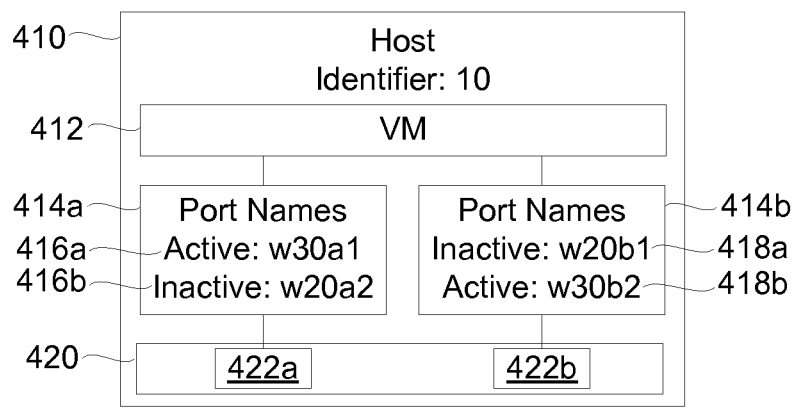

As shown in FIG. 4B, cluster manager 112 identifies a target host identifier for each port name of VM 412 (see operation 314). Each port name of VM 412 is assigned to a port of a VM that is to remain in the cluster. Cluster manager 112 selects host identifier "20" of the set of host identifiers.

As shown in FIG. 4B, cluster manager 112 updates the inactive port names. Cluster manager 112 updates port names 416b and 418a, which are inactive, by replacing each of port names 416b and 418a with a replacement port name based on the target host identifier. Each replacement port name is further based on the port to which it is assigned.

Figure 4C:
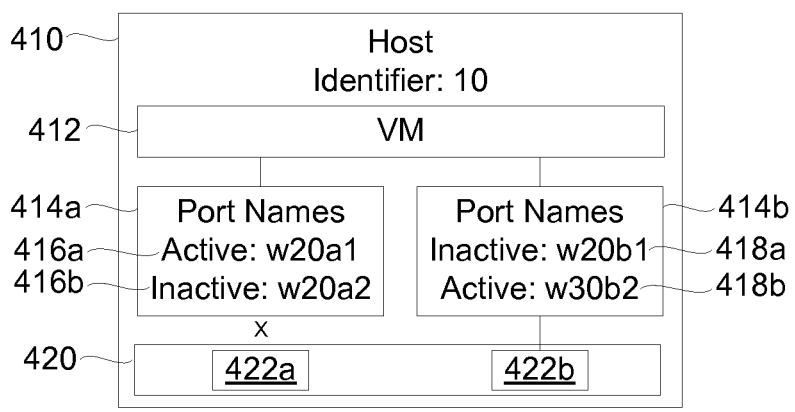
Figure 4D:
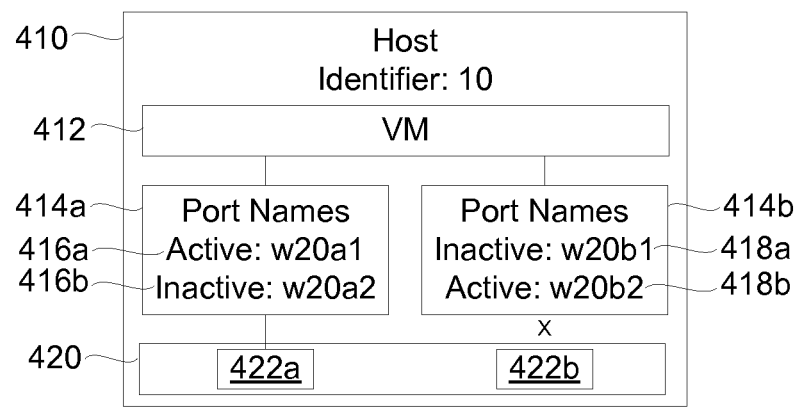
Figure 4E:
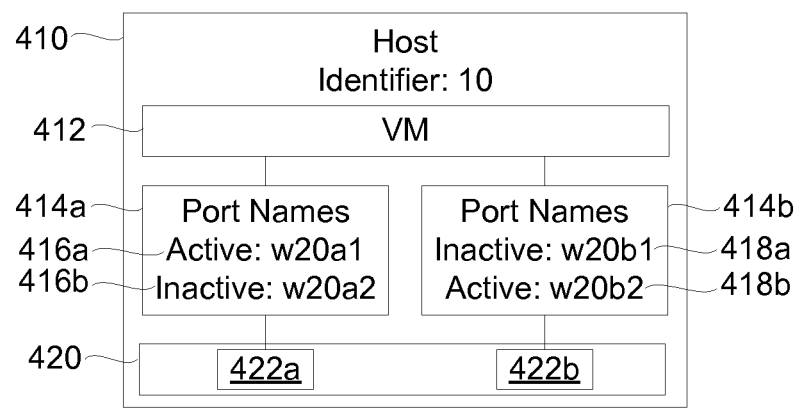

As shown in FIGS. 4C-4E, cluster manager 112 cycles and updates each port of VM 412 in turn (see operation 322). As shown in FIG. 4C, cluster manager 112 deactivates vHBA 422a. Cluster manager disables the network connection of vHBA 422a. Cluster manager replaces active port name 416a with a replacement port name based on the target host identifier.

Cluster manager 112 enables the network connection of vHBA 422a and activates vHBA 422a. As shown in FIG. 4D, cluster manager 112 deactivates vHBA 422b. Cluster manger 112 disables the network connection of vHBA 422b. Cluster manager replaces active port name 418b with a replacement port name based on the target host identifier.

As shown in FIG. 4E, cluster manager 112 enables the network connection of vHBA 422b and activates vHBA 422b. The port names assigned to the ports of VM 412 are now based on host identifier "20", which is a host identifier of the set of host identifiers of the cluster.

FIGS. 5A-5D are block diagrams depicting an example in which port names are updated, in accordance with an embodiment of the present disclosure. Cluster 502 includes host 510 and host 520. In this example, cluster manager 112 receives user input specifying to remove host 510 from cluster 502. Cluster manager 112 migrates VM 512 from host 510 to host 520 and updates port names 514. VM 512 represents an instance of a virtual machine residing on host 510. VM 522 represents an instance of the same virtual machine migrated to and residing on host 520. Host 510 includes VM 512 and HBA 516. VM 512 is associated with port names 514. VM 512 connects to a network via vHBA 518 using an active port name of port names 514. Host 520 includes HBA 526. Cluster 502 has a set of host identifiers, which is {20, 30}. Host 510 is associated with host identifier "30" and host 520 is associated with host identifier "20". Port names 514 of VM 512 are based on the host identifier of 510 ("30").

Figure 5A:
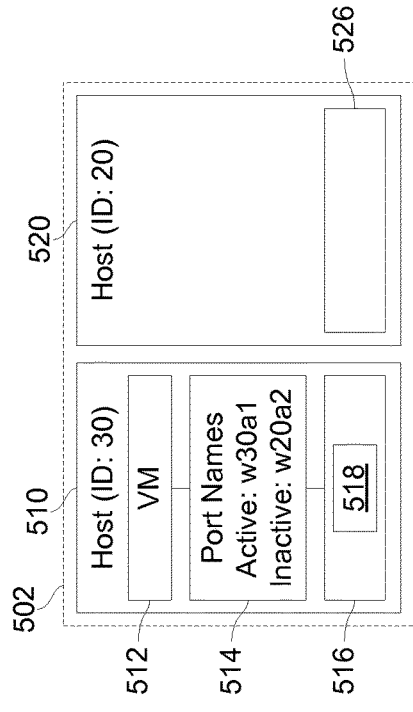
FIGS. 5A-5D are block diagrams depicting an example in which port names are updated, in accordance with an embodiment of the present disclosure.

In FIG. 5A, cluster manager 112 identifies host 510 as the outgoing host based on user input specifying to remove host 510 from cluster 502 (see operation 302). Cluster manager 112 determines the host identifier for host 510 to be "30" based on "30" being a host identifier of the set of host identifiers of cluster 502 and on host 510 being associated with host identifier "30" (see operation 304). Cluster manager 112 updates the set of host identifiers of cluster 502 to mark host identifier "30" as ineligible upon which to base port names (see operation 306). Cluster manager 112 determines that VM 512 is to remain in cluster 502 (see decision 308). Cluster manager 112 identifies port names 514 as port names to update (see operation 312). Cluster manager 112 identifies host identifier "20" as the target host identifier based on host identifier "20" being a host identifier of the set of host identifiers of cluster 502 that is eligible upon which to base port names (see operation 314). Port names 514 include active port name "w30a1" and inactive port name "w30a2".

Figure 5B:
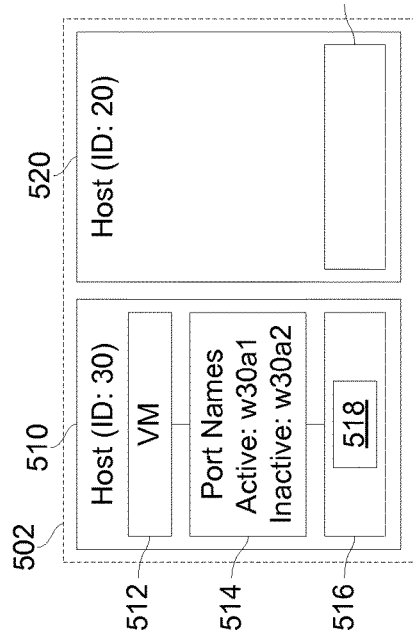

In FIG. 5B, cluster manager 112 updates inactive port names of port names 514 (see operation 320). Cluster manager 112 updates inactive port name "w30a2" based on target host identifier "20". Thus, cluster manager 112 updates inactive port name "w30a2" to "w20a2".

Figure 5C:
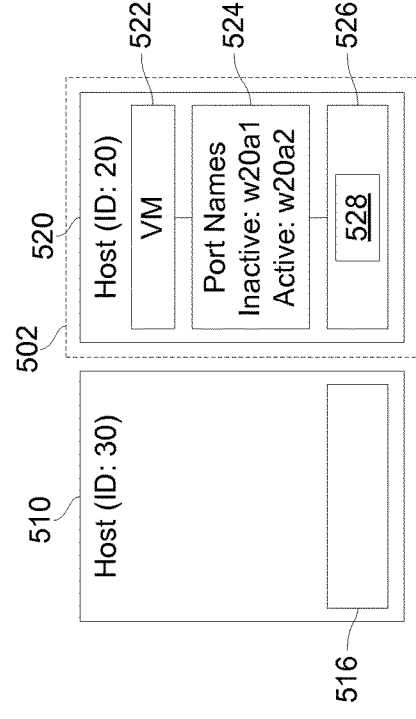

In FIG. 5C, cluster manager 112 migrates VM 512 from host 510 to host 520 (see operation 310). The migrated instance of VM 512 is VM 522. VM 522 is associated with port names 524. VM 522 connects to the network via vHBA 528 using an active port name of port names 524. Cluster manager 112 activates the updated port name of port names 524 and deactivates the port name remaining to be updated. Thus, port names 524 include inactive port name "w30a1" and active port name "w20a2". VM 512 and VM 522 are instances of the same virtual machine. Cluster manager 112 establishes a network connection of VM 522. In one embodiment, the two instances VM 512 and 522 of the same virtual machine now have access to the storage devices via an active network connection on hosts 510 and 512, respectively. For example, live migration of the virtual machine from host 510 to host 512 can be performed. These two active network connections on two different hosts are retained until the live migration of the virtual machine to host 512 completes, at which point the instance VM 512 on host 510 can be deactivated, while instance 522 on host 520 continues running as the only instance of this virtual machine.

Figure 5D:
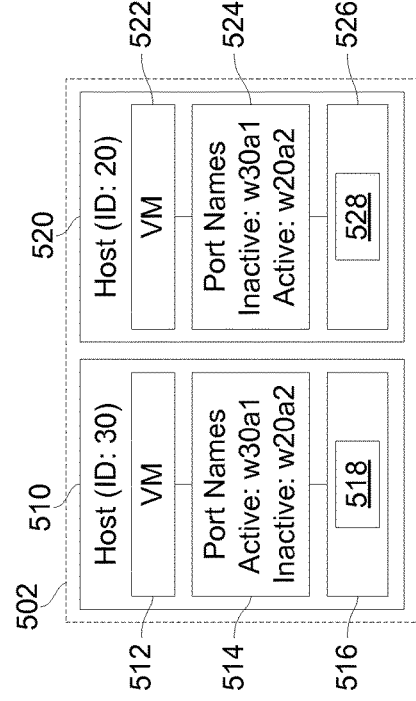

In FIG. 5D, cluster manager 112 updates the inactive port names based on the target host identifier (see operation 320). In particular, cluster manager updates inactive port name "w30a1" of port names 524 to inactive port name "w20a1". Port names 524 are now based on a host identifier of the set of host identifiers of cluster 502 (namely, host identifier "20"). Cluster manager 112 removes VM 512, port names 514, and vHBA 518 from host 510. Cluster manager 112 removes host 510 from cluster 502.

Figure 6:
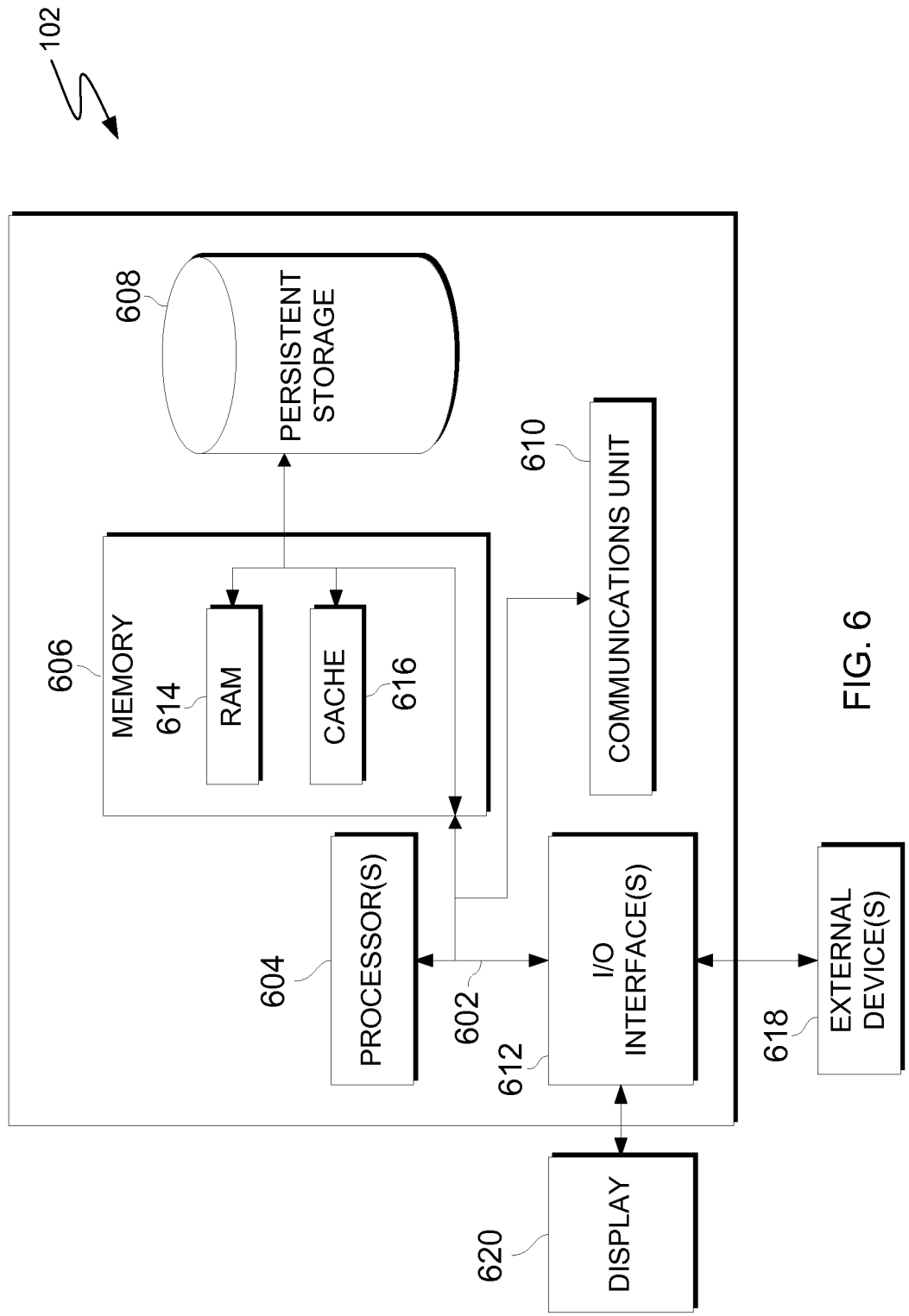
FIG. 6 is a block diagram of components of a computing device executing operations for cluster management, in accordance with an embodiment of the present disclosure.

FIG. 6 depicts a block diagram of components of computing device 102, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Cluster manager 112 and cluster data 114 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of one or both of network 150 and SAN 155. In these examples, communications unit 610 includes one or more network interface cards. Communications unit 610 may provide communications through the use of either or both physical and wireless communications links. Cluster manager 112 and cluster data 124 may be downloaded to persistent storage 608 through communications unit 610.

I/O interface(s) 612 allows for input and output of data with other devices that may be connected to computing device 102. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., cluster manager 112 and cluster data 124, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The term(s) "Smalltalk" and the like may be subject to trademark rights in various jurisdictions throughout the world and are used here only in reference to the products or services properly denominated by the marks to the extent that such trademark rights may exist.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for reconfiguring a cluster of computing devices running virtual machines, the method comprising:
in response to removing a first computing system of a plurality of computing systems from a computing system cluster including the plurality of computing systems, modifying a plurality of port names associated with a second computing system of the plurality of computing systems, wherein the second computing system includes a storage resource that is accessible via at least one of a first port and a second port that are connected to a storage area network, and wherein the first port utilizes a first active port name of the plurality of port names that is based on a first computing system identifier that is associated with the first computing system and the second port utilizes a second active port name of the plurality of port names that is based on the first computing system identifier, modifying the plurality of port names comprising:
  terminating access via the first port, and in response, modifying the first port name based on a target computing system identifier;
  re-establishing access via the first port;
  in response to re-establishing access via the first port, terminating access via the second port and modifying the second active port name based on the target computing system identifier; and
  re-establishing access via the second port.

2. The method of claim 1, further comprising:
in response to removing the first computing system, removing the first computing system identifier from a set of computing system identifiers that includes the target computing system identifier.

3. The method of claim 2, wherein modifying the plurality of port names further comprises:
  identifying the target computing system identifier from among the set of computing system identifiers, wherein the target computing system identifier is not the first computing system identifier.

4. The method of claim 3, further comprising:
  adding the first computing system to the plurality of computing systems of the computing system cluster, wherein the first computing system is associated with the first computing system identifier;
  dissociating the first computing system identifier from the first computing system identifier; and
  adding the first computer system identifiers to the set of computing system identifiers.

5. The method of claim 4, further comprising:
  selecting the first computing system identifier from the set of computing system identifiers in response to removing the first computing system; and
  associating the first computing system identifier with the first computing system.

6. The method of claim 5, wherein modifying the plurality of port names is in response to determining that at least the first active port name and the second active port name are based on the first computing system identifier of the first computing system.

7. The method of claim 3, further comprising:
  adding the first computing system to the plurality of computing systems of the computing system cluster, wherein the first computing system is associated with a second computing system identifier;
  dissociating the first computing system from the second computing system identifier; and
  adding the second computer system identifier to the set of computing system identifiers.

8. The method of claim 7, wherein the target computing system identifier is the second computing system identifier.

9. The method of claim 1, wherein (i) the first port is associated with a first inactive port name of the plurality of port names that is based on the first computing system identifier and (ii) the second port is associated with a second inactive port name of the plurality of port names that is based on the first computing system identifier, modifying the plurality of port names further comprises:
  modifying the first inactive port name of the first connection and modifying the second inactive port name of the second connection prior to modifying any active port names of the plurality of port names.

10. The method of claim 9, wherein:
the first active port name and the first inactive port name are modified based on an identifier of the first port; and
the second active port name and the second inactive port name are modified based on an identifier of the second port.

11. A method for reconfiguring a cluster of computing devices running virtual machines, the method comprising:
  in response to removing a source computing system of a plurality of computing systems from a computing system cluster including the plurality of computing systems, migrating a virtual machine of the source computing system to a destination computing system of the plurality of computing systems, wherein (i) the virtual machine is associated with a first port name and a second port name, (ii) the virtual machine can access a storage resource via a storage area network utilizing active port names, and (iii) the virtual machine cannot access the storage resource via the storage area network utilizing inactive port names, and wherein migrating the virtual machine comprises:
    in response to determining that the first port name is an inactive port name with respect to a port of the source computing system, modifying the first port name with respect to the port associated with the source computing system based on a target computing system identifier of a set of computing system identifiers;
    creating a copy of the virtual machine on the destination computing system, wherein the copy of the virtual machine on the destination computing system is associated with the modified first port name;
    activating the modified first port name with respect to a port associated with the destination computing system such that the modified first port name is an active port name, and in response:
      deactivating the second port name with respect to a port of the destination computing system such that the second port name is an inactive port name; and
      modifying the second port name with respect to the port of the destination computing system based on the target computing system identifier.

12. The method of claim 11, further comprising:
in response to removing the source computing system, removing a first computing system identifier from the set of computing system identifiers that includes the target computing system identifier.

13. The method of claim 12, wherein migrating the virtual machine comprises:
  identifying the target computing system identifier from among the set of computing system identifiers, wherein the target computing system identifier is not the first computing system identifier.

14. The method of claim 13, further comprising:
  adding the source computing system to the plurality of computing systems of the computing system cluster, wherein the source computing system is associated with the first computing system identifier;
  dissociating the first computing system identifier from the source computing system identifier; and adding the first computer system identifiers to the set of computing system identifiers.

15. The method of claim 14, further comprising:
selecting the first computing system identifier from the set of computing system identifiers in response to the one or more instructions to remove the source computing system; and
associating the first computing system identifier with the source computing system.

16. The method of claim 15, wherein migrating the virtual machine is in response to determining that at least the first port name and the second name, with respect to the port of the source computing system, are based on the first computing system identifier of the first computing system.

17. The method of claim 13, further comprising:
adding the source computing system to the plurality of computing systems of the computing system cluster, wherein the source computing system is associated with a second computing system identifier;
dissociating the source computing system from the second computing system identifier; and
adding the second computer system identifier to the set of computing system identifiers.

18. The method of claim 17, wherein the target computing system identifier is the second computing system identifier.

19. The method of claim 11, wherein the first port name and the second port name are modified based on an identifier of the port of the destination computing system.

\* \* \* \* \*